(12) United States Patent
Shiraishi et al.

(10) Patent No.: US 8,096,580 B2
(45) Date of Patent: Jan. 17, 2012

(54) AIR BAG APPARATUS AND GAS GENERATOR FOR THE SAME

(75) Inventors: Ryutaro Shiraishi, Aichi-ken (JP); Jianlin Chen, Aichi-ken (JP); Yoji Tasaki, Aichi-ken (JP)

(73) Assignee: Autoliv ASP Inc., Ogden, UT (US)

( * ) Notice: Subject to any disclaimer, the term of this patent is extended or adjusted under 35 U.S.C. 154(b) by 0 days.

(21) Appl. No.: 12/717,409

(22) Filed: Mar. 4, 2010

(65) Prior Publication Data

US 2010/0225099 A1 Sep. 9, 2010

(30) Foreign Application Priority Data

Mar. 6, 2009 (JP) ................................. 2009-053407
Feb. 15, 2010 (JP) ................................. 2010-029630

(51) Int. Cl.
*B60R 21/26* (2011.01)
(52) U.S. Cl. ........................................ 280/736; 280/741
(58) Field of Classification Search .................. 280/736, 280/741
See application file for complete search history.

(56) References Cited

U.S. PATENT DOCUMENTS

| | | | |
|---|---|---|---|
| 4,950,458 A | 8/1990 | Cunningham | |
| 4,998,751 A | 3/1991 | Paxton et al. | |
| 6,053,531 A * | 4/2000 | Katsuda et al. | 280/741 |
| 6,679,521 B2 * | 1/2004 | Yamazaki et al. | 280/741 |
| 6,926,304 B2 * | 8/2005 | Miyaji et al. | 280/741 |
| 7,114,746 B2 * | 10/2006 | Miyaji et al. | 280/741 |
| 7,125,041 B2 * | 10/2006 | Kato et al. | 280/736 |
| 7,516,701 B2 * | 4/2009 | Kurita et al. | 102/530 |
| 7,516,983 B2 * | 4/2009 | Suehiro et al. | 280/741 |
| 7,556,289 B2 * | 7/2009 | Katsuda et al. | 280/736 |
| 7,591,483 B2 * | 9/2009 | Nakayasu et al. | 280/741 |
| 7,651,128 B2 * | 1/2010 | Ohji et al. | 280/741 |
| 7,651,129 B2 * | 1/2010 | Nakayasu et al. | 280/741 |
| 7,744,124 B2 * | 6/2010 | Yamazaki | 280/736 |
| 2005/0039623 A1 | 2/2005 | Furusawa et al. | |

FOREIGN PATENT DOCUMENTS

JP 08-207696 8/1996
JP 11-334517 12/1999

* cited by examiner

*Primary Examiner* — Toan To
(74) *Attorney, Agent, or Firm* — Brinks Hofer Gilson & Lione

(57) ABSTRACT

An airbag device may include a gas generator comprising: an initiator that is activated by an impact on a vehicle; an ignition agent that is ignited by the initiator; an ignition agent housing chamber that houses the ignition agent; a gas generating agent that is ignited and burned by the ignition agent; and a combustion chamber housing the gas generating agent. An airbag may be inflated by a gas generated by the combustion of the gas generating agent. Further, the ignition agent housing chamber is only partially filled with the ignition agent, thereby forming a space in the ignition agent housing chamber that is not filled with the ignition agent.

2 Claims, 6 Drawing Sheets

[FIG. 1]
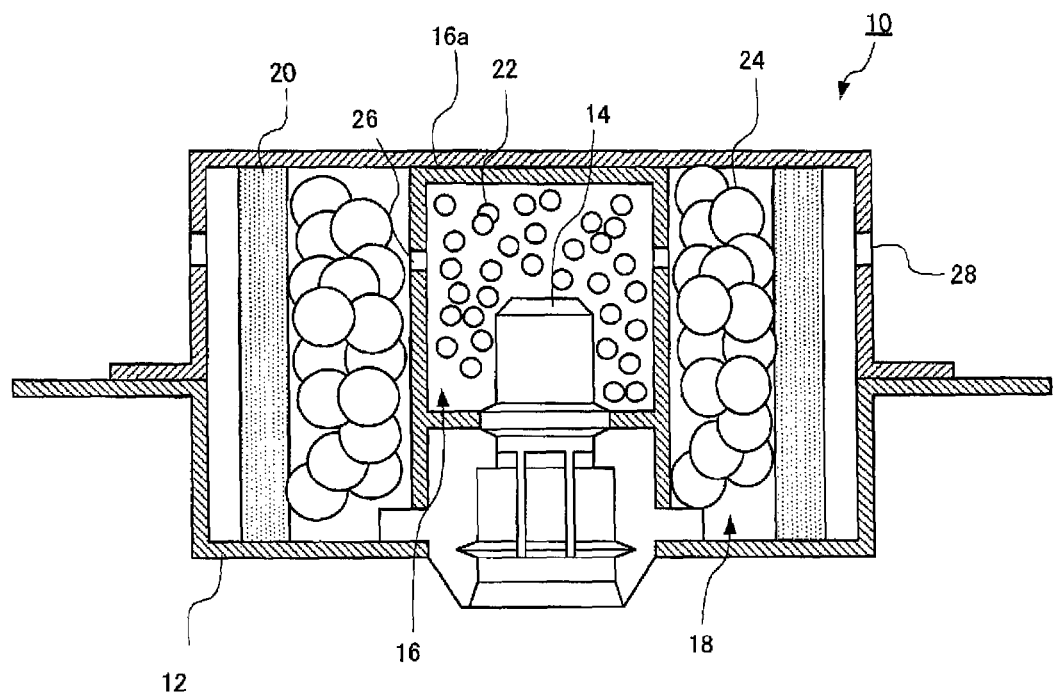

[FIG. 2]
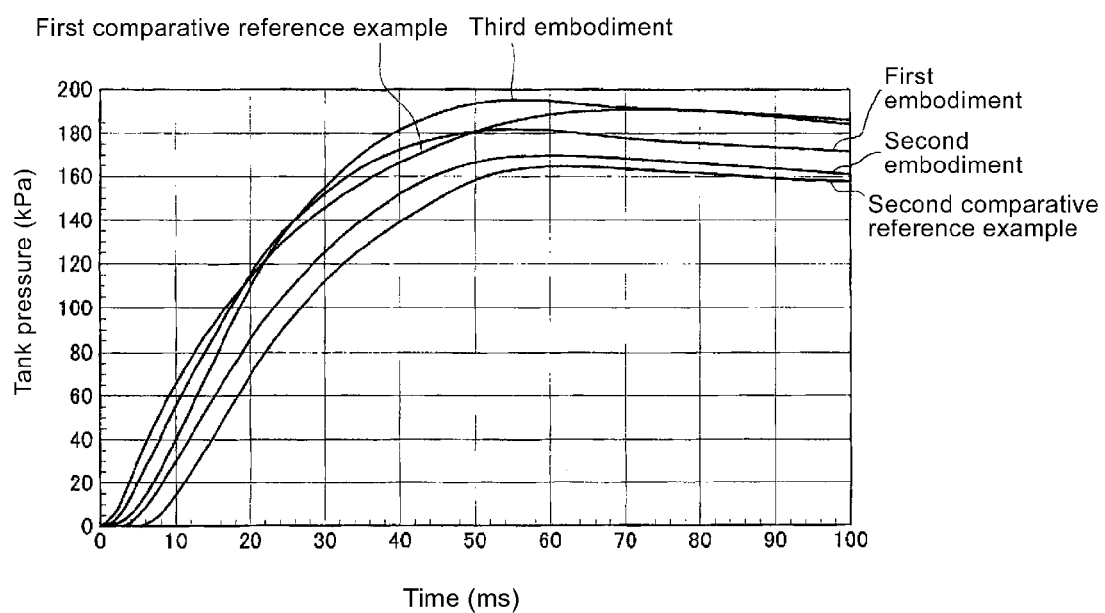

[FIG. 3]

| Type | Charging amount of gasgenerating agent 24 | Charging ratio of ignition agent 22 relative to volume of ignition agent housingchamber 16 (bulk density: volume %) |
|---|---|---|
| First comparative reference example | Normal amount | 65 |
| First embodiment | Normal amount | 50 |
| Second embodiment | Normal amount | 30 |
| Second comparative reference example | Normal amount | 25 |
| Third embodiment | Approximately 10% greater than normal amount | 30 |

[FIG. 4]
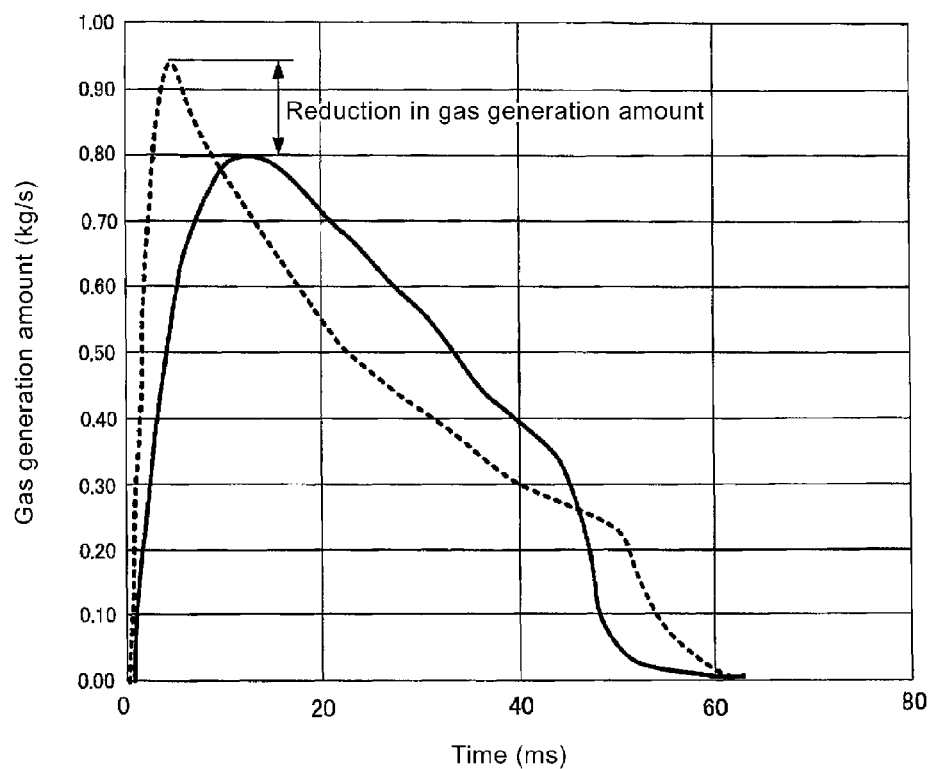

[FIG. 5]
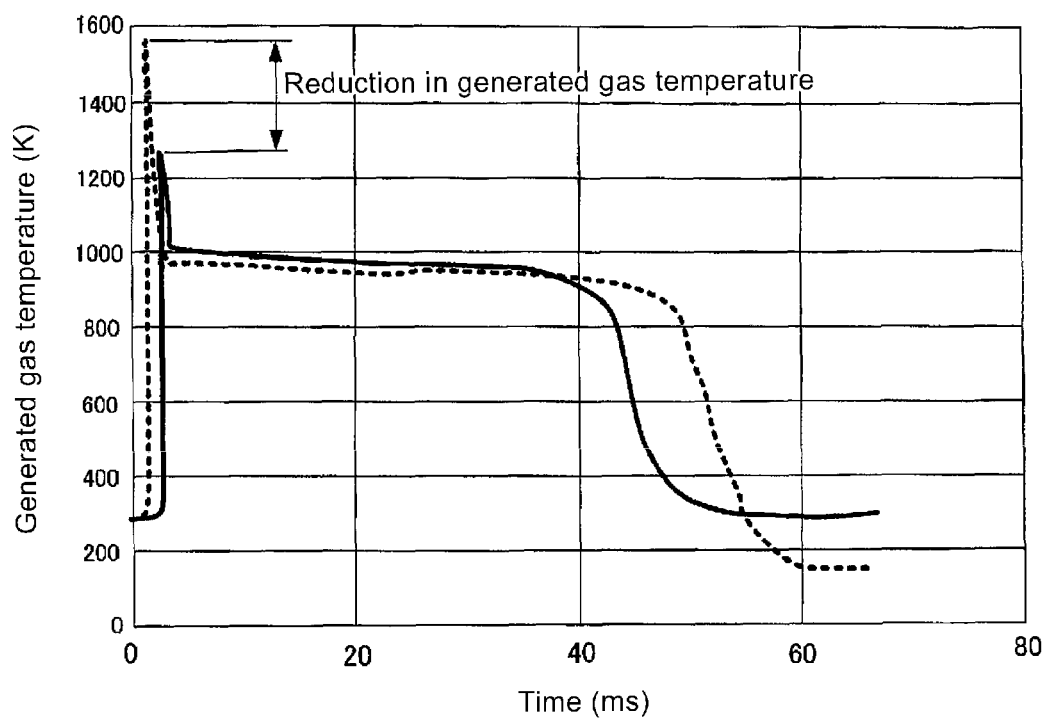

[FIG. 6]
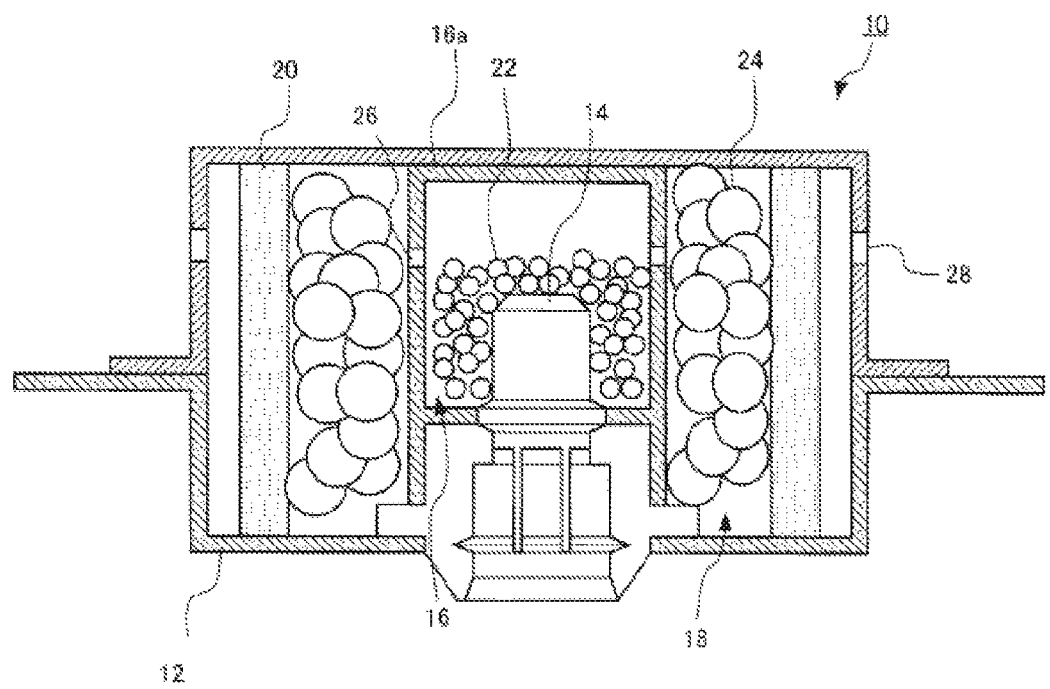

AIR BAG APPARATUS AND GAS GENERATOR FOR THE SAME

RELATED APPLICATIONS

The present application claims priority to Japanese Patent Application Nos. 2009-053407, filed Mar. 6, 2009 and 2010-029630, filed Feb. 15, 2010, the entirety of which are hereby incorporated by reference.

TECHNICAL FIELD

The present invention relates to an airbag device and a gas generator installed in a vehicle, and more particularly to an improvement in a gas generator for an airbag device having a featured activation performance.

BACKGROUND

Vehicles such as automobiles are installed with an airbag system that may prevent serious injury or death occurring when an occupant comes into contact with a hard part in the interior of the vehicle, such as a steering wheel or a front windshield, during a collision or the like by rapidly inflating a bag with gas to prevent the occupant from contacting such dangerous locations.

An airbag system is preferably capable of restraining the occupant safely, regardless of the body shape (for example, a seated height and so on) of the occupant, the attitude of the occupant (for example, when the occupant is holding the steering wheel), and so on. Accordingly, airbag systems that help ensure that minimal impact is applied to the occupant during an initial activation stage have been proposed in the related art.

In Japanese Patent Application Publication No. 08-207696, gas is generated in two stages such that the airbag is inflated comparatively slowly in the first stage. In the second stage, gas is generated rapidly. For this purpose, two types of gas generating agent capsules are used. As a result, however, the internal structure of the gas generator becomes complicated and the size of a container increases, thus leading to an increase in cost.

[Patent Document 1] Japanese Patent Application Publication No. 08-207696.

U.S. Pat. Nos. 4,998,751 and 4,950,458 similarly propose that an activation function of the gas generator be restricted by providing two combustion chambers such that the gas generating agent is burned in two stages. However, a similar increase in structural complexity occurs in this case, and therefore these proposals cannot be considered satisfactory.

[Patent Document 2] U.S. Pat. No. 4,998,751.
[Patent Document 3] U.S. Pat. No. 4,950,458.

Furthermore, Japanese Patent Application Publication No. 11-334517 discloses a structure for reducing an impact force of the airbag during the initial activation stage by providing a gap in a space that houses the gas generating agent. As a result, however, it is difficult to obtain the initially required amount of gas, and therefore an occupant restraining performance may deteriorate.

[Patent Document 4] Japanese Patent Application Publication No. 11-334517.

SUMMARY

The present invention has been designed in consideration of the conditions described above, and an object thereof is to provide an airbag device and a gas generator used therein with which damage to an airbag module and an impact on an occupant can be reduced during an initial activation stage and the occupant can be restrained reliably while maintaining structural simplicity.

In one aspect, a gas generator for an airbag device may include: an initiator (igniter) that is activated by an impact on the vehicle; an ignition agent that is ignited by the initiator; an ignition agent housing chamber housing the ignition agent; a gas generating agent that is ignited and burned by the ignition agent; and a combustion chamber housing the gas generating agent. An airbag is inflated by a gas generated through combustion of the gas generating agent. Further, the ignition agent housing chamber is only partially filled with the ignition agent, thereby forming a space in the ignition agent housing chamber that is not filled with the ignition agent.

In a second aspect the airbag device may include, in addition to the gas generator described above, an airbag that is inflated and deployed by a gas generated by the gas generator.

The ignition agent may occupy about 30% to about 50% of an interior volume of the ignition agent housing chamber such that the remainder constitutes the space.

According to another aspect, activation may be performed such that minimal impact is applied to the occupant during the initial activation stage and the occupant can be restrained reliably while maintaining structural simplicity.

The foregoing paragraphs have been provided by way of general introduction, and are not intended to limit the scope of the following claims. The presently preferred embodiments, together with further advantages, will be best understood by reference to the following detailed description taken in conjunction with the accompanying drawings.

BRIEF DESCRIPTION OF THE DRAWINGS

FIG. 1 is a schematic sectional view showing the structure of a gas generator for an airbag device according to an embodiment of the present invention;

FIG. 2 is a graph showing a characteristic of the gas generator for an airbag device according to an embodiment of the present invention;

FIG. 3 is a table showing relative fill amounts of a gas generating agent and an ignition agent in the gas generator for an airbag device according to an embodiment of the present invention;

FIG. 4 is a graph showing characteristics of gas generators for an airbag device according to a comparative reference example and an embodiment of the present invention;

FIG. 5 is a graph showing characteristics of gas generators for an airbag device according to a comparative reference example and an embodiment of the present invention; and FIG. 6 is a schematic sectional view showing the structure of a gas generator for an airbag device according to an embodiment of the present invention.

DETAILED DESCRIPTION

FIG. 1 is a schematic sectional view showing the structure of a gas generator for an airbag device according to an embodiment of the present invention. A gas generator 10 for an airbag device according to this embodiment includes an initiator (igniter) 14 that is activated by an impact on a vehicle, an ignition agent 22 that is ignited by the initiator 14, an ignition agent housing chamber 16 housing the ignition agent 22, a gas generating agent 24 that is ignited and burned by the ignition agent 22, and a combustion chamber 18 housing the gas generating agent 24.

The gas generator 10 according to this embodiment is structured to inflate an airbag using gas generated when the gas generating agent 24 is burned. A feature of this embodiment is that the ignition agent 22 is loaded or filled into the ignition agent housing chamber 16 such that a space is formed in the interior of the ignition agent housing chamber 16 in which the ignition agent 22 is not present. The ignition agent 22 is preferably filled to approximately 30% to 50% of the interior volume of the ignition agent housing chamber 16 so that the remainder of the housing chamber 16 forms the space.

FIG. 1 shows a condition of a moving vehicle, for example. In the moving state, the ignition agent 22 is not settled. On the other hand, when the vehicle is parked (a non moving condition), for example, the ignition agent 22 is settled downward as shown in FIG. 6, and the space in which the ignition agent 22 is not filled expands in an upper part of the ignition agent housing chamber 16.

The gas generator 10 also includes a housing 12 constituted by an upper/lower pair of shells. The housing 12 may be molded by casting, forging, pressing, and so on. A plurality of gas discharge ports 28 having a diameter of approximately 3 mm, for example, are provided in a circumferential direction in a peripheral wall portion of the housing 12 (for example, eighteen discharge ports are provided at equal intervals) such that the airbag (not shown) is inflated and deployed by gas discharged through the discharge ports 28.

An igniter cup 16a forming the ignition agent housing chamber 16 described above may be formed by a method such as casting, forging, pressing, or cutting, or a combination thereof. The initiator 14 is provided in the igniter cup 16a and the ignition agent 22 is housed therein. A through hole 26 is formed in a peripheral wall of the igniter cup 16a as a flow passage for a flame by which the gas generating agent 24 in the combustion chamber 18 is burned.

A coolant filter 20 that purifies and cools the gas generated by ignition and combustion of the gas generating agent 24 is provided in the housing 12. The coolant filter 20 is disposed so as to surround the gas generating agent 24, thereby defining an annular chamber, or in other words the gas generating agent combustion chamber 18, on the periphery of the igniter cup 16a. The coolant filter 20 may be molded by overlapping gauze made of stainless steel, for example, in a radial direction and then compressing the overlapped gauze in the radial direction and an axial direction.

Similarly to the ignition agent housing chamber 16, the combustion chamber 18 may be formed with a space in which the gas generating agent 24 does not exist. However, when an excessively large space (roughly 10% or more of the total volume, for example) is formed, a gas generation amount decreases, and therefore the space is preferably made as small as possible.

FIG. 2 is a graph showing experiment results relating to comparative reference examples and embodiments of the present invention. FIG. 2 shows temporal variation in a post-ignition tank pressure of the gas generator when a fill ratio of the ignition agent 22 is adjusted relative to the volume of the ignition agent housing chamber 16. The vertical axis shows the tank pressure and the horizontal axis shows the passage of time from the moment at which ignition is performed by the initiator. FIG. 2 shows first and second comparative reference examples and first, second and third embodiments.

FIG. 3 is a table showing relative fill amounts of the gas generating agent 24 and the ignition agent 22 in the comparative reference examples and the embodiments of the present invention.

As shown in FIG. 2, with the structure of this embodiment, the tank pressure at an initial activation stage of the gas generator (airbag device) can be suppressed below that of the comparative reference examples when the fill ratio of the ignition agent is about 50% or less. When the fill ratio of the ignition agent is reduced, a start time at which tank pressure increases may be delayed. This delay in the start time for increase in the tank pressure leads to delays in airbag inflation and passenger restraint. However, as long as the fill ratio of the ignition agent is at least 30%, the tank pressure increase start time is not delayed to a problematic extent.

Meanwhile, when the fill ratio of the ignition agent 22 is reduced relative to the volume of the ignition agent housing chamber 16, a maximum value of the tank pressure also decreases below that of the first comparative reference example, as shown in FIG. 2. A small decrease does not pose a problem. However, it is evident from the embodiment in which the fill amount of the gas generating agent 24 is increased that by increasing the amount of gas generating agent, a maximum value equal to that of the first comparative reference example can be obtained even while reducing the tank pressure during the initial activation stage. In the third embodiment, sufficient tank pressure is obtained from an intermediate stage to a late stage of activation.

Note that the tank pressures shown in FIG. 2 were measured in a tank combustion test employing the following method. A gas generator for an airbag is fixed in the interior of a tank (made of stainless steel or aluminum) having an interior volume of 60 liters, whereupon the tank is sealed at room temperature and connected to an external ignition electric circuit. A switch of the ignition electric circuit is turned ON (an ignition current is applied) by a pressure transducer disposed separately in the tank at a time 0, whereupon upward variation in the tank pressure is measured for a period of 0 to 100 milliseconds. Finally, respective measurement data are turned into a tank pressure/time curve by computer processing, and as a result, a curve (hereinafter referred to as a "tank curve") for evaluating the performance of a gas generating agent molded body is obtained.

FIGS. 4 and 5 are graphs showing a characteristic of the gas generator for an airbag device according to the third embodiment of the present invention. FIG. 4 shows temporal displacement in the gas generation amount (mass flow) of the gas generator, wherein the gas generator according to the third embodiment is indicated by a solid line and the gas generator according to the first comparative reference example is indicated by a broken line. It is evident from FIG. 4 that with the structure according to this embodiment, the gas generation amount can be suppressed to a low level at the initial activation stage of the gas generator (airbag device). Thereafter, i.e. from the intermediate stage to the late stage of activation, a sufficient amount of gas is obtained.

FIG. 5 shows temporal displacement in a generated gas temperature of the gas generator, wherein the gas generator according to the third embodiment is indicated by a solid line and the gas generator according to the first comparative reference example is indicated by a broken line. It is evident from FIG. 5 that with the structure according to this embodiment, the gas temperature can be suppressed to a low level at the initial activation stage of the gas generator (airbag device). Thereafter, i.e. from the intermediate stage to the late stage of activation, substantially identical behavior to that of a conventional gas generator is exhibited.

As described above, during the initial activation stage of the airbag device according to this embodiment, the airbag is inflated gently by a comparatively small amount of gas and at a comparatively low gas temperature and a comparatively low gas pressure. Therefore, damage to the airbag module and harm to an occupant can be reduced. Thereafter, the airbag is inflated and deployed by a sufficient amount of gas and at a sufficient gas temperature and a sufficient gas pressure, and therefore the occupant is restrained appropriately.

Embodiments of the present invention were described above, but the present invention is not limited to the above embodiments, and various design modifications and so on may be implemented within a scope that does not depart from the technical spirit of the claims.

For example, in the third embodiment, the amount of gas generating agent is approximately 10% greater than a normal fill amount of gas generating agent, but as long as conditions such as the fill density are satisfied, other fill ratios may be employed. More specifically, the amount of gas generating agent may be increased within a range that does not impair the effects of the present invention, or in other words by a maximum of approximately 20% relative to a standard gas generating agent amount.

While presently preferred embodiments have been described, it should be understood that modifications may be made without departing from the invention. The scope of the invention is defined by the appended claims, and all devices that come within the meaning of the claims, either literally or by equivalence, are intended to be embraced therein. Furthermore, the advantages of the embodiments described above are not necessarily the only advantages of the embodiments, and it is not necessarily expected that all of the described advantages will be achieved with every embodiment.

The invention claimed is:

1. A gas generator for an airbag device, comprising:
an initiator that is activated by an impact on said vehicle;
an ignition agent that is ignited by said initiator, said ignition agent being housed in an ignition agent housing chamber; and
a gas generating agent that is ignited and burned by said ignition agent, said gas generating agent being housed in a combustion chamber,
wherein an airbag is inflated by a gas generated through combustion of said gas generating agent, and
wherein said ignition agent housing chamber defines an interior volume, the interior volume being filled with said ignition agent and an air space that is contiguous with said ignition agent,
wherein said ignition agent occupies about 30% to about 50% of the interior volume of said ignition agent housing chamber, and the air space occupies about 70% to 50% of the interior volume of said ignition agent housing chamber.

2. An airbag device, comprising:
an airbag; and
a gas generator comprising:
an initiator that is activated by an impact on said vehicle;
an ignition agent that is ignited by said initiator, said ignition agent being housed in an ignition agent housing chamber, wherein said ignition agent housing chamber and said initiator define an interior volume, the interior volume being filled with said ignition agent and an air space that is contiguous with said ignition agent; and
a gas generating agent that is ignited and burned by said ignition agent, said gas generating agent being housed in a combustion chamber,
wherein said airbag is inflated and deployed by a gas generated through combustion of said gas generating agent,
wherein said ignition agent occupies about 30% to about 50% of the interior volume of said ignition agent housing chamber, and the air space occupies about 70% to 50% of the interior volume a remainder of said ignition agent housing chamber.

* * * * *